United States Patent [19]

Livshits et al.

[11] Patent Number: 4,986,143
[45] Date of Patent: Jan. 22, 1991

[54] TRANSMISSION SHIFT CONTROL MECHANISM WITH PARK LOCK

[75] Inventors: Mikhail Livshits, Kentwood; Gerald J. Lafferty, Jr., Muskegon; Donald R. Rempinski, Grand Haven, all of Mich.

[73] Assignee: Sparton Corporation, Jackson, Mich.

[21] Appl. No.: 453,592

[22] Filed: Dec. 20, 1989

Related U.S. Application Data

[63] Continuation of Ser. No. 137,759, Dec. 24, 1987, Pat. No. 4,938,158.

[51] Int. Cl.$^5$ .............................................. F16H 63/36
[52] U.S. Cl. ........................................ 74/475; 74/477; 74/483 R; 74/878
[58] Field of Search ...................... 74/475, 477, 483 R, 74/878; 70/248, 254

[56] References Cited

U.S. PATENT DOCUMENTS

4,660,443  4/1987  Simancik .............................. 74/878

Primary Examiner—Leslie A. Braun
Assistant Examiner—Scott Anchell
Attorney, Agent, or Firm—Reising, Ethington, Barnard, Perry & Milton

[57] ABSTRACT

The pivot axis of a locking lever is used as the main gage or reference point relative to which the dimensions of components of the shift control mechanism are taken and, together with the geometry of the bellcrank, provide a transmission shift control mechanism that has no need for adjustment of the components involved upon assembly of the shift control mechanism with the ignition lock mechanism in the vehicle.

5 Claims, 5 Drawing Sheets

TRANSMISSION SHIFT CONTROL MECHANISM WITH PARK LOCK

This is a continuation of application Ser. No. 137,759, now U.S. Pat. No. 4,938,158 filed on Dec. 24, 1987.

FIELD OF THE INVENTION

This invention relates to a vehicle transmission shift control mechanism having interconnection with the vehicle ignition lock mechanism.

BACKGROUND OF THE INVENTION

The DeVogelaere et al U.S. Pat. No. 4,474,085 discloses a transmission shift control mechanism with an ignition lock mechanism on the steering column. In this system, a bellcrank lever is pivoted on the support frame of the shifter and has one arm operably connected to the ignition interlock cable. The other arm of the lever is connected by a pin and slot with the thumb button-actuated push rod for the detent pawl. When the shift lever is in the "Park" position, the detent pushbutton movement allows the push rod to be lifted and the bellcrank lever to pivot to a position permitting movement of the ignition interlock cable to the "Lock" position Once the ignition lock mechanism is locked, the ignition interlock cable prevents the bellcrank lever from pivoting and the pin and slot connection between the bellcrank and push rod blocks the detent from being released from the "Park" position. Therefore, the shift lever cannot be moved from the "Park" position when the ignition lock mechanism is locked.

The Kimberlin U.S. Pat. No. 4,249,404 discloses a transmission shift control interlock system in which a locking pawl engages a stationary latch when the shift lever in the "Park" position is forcibly moved by a small amount. The locking pawl is pivotally mounted on the shift lever bracket and is cam actuated by slight movement of the shift lever. The locking pawl is pivotally mounted on the base of the shift control mechanism and is connected with the steering column lock cable. A similar arrangement is shown in the Osborn U.S. Pat. No. 4,304,112.

The Kimberlin U.S. Pat. No. 4,323,571 discloses a transmission shift control mechanism in which the steering column cable is connected through a leaf spring to the shift lever bracket. When the steering column is locked, any movement of the shift lever results in flexing of the spring and thus no movement is transmitted to the transmission cable.

The Simancik et al U.S. Pat. No. 4,235,123 discloses a transmission/ignition interlock system including a push-/pull operator cable. The interlock mechanism includes a transmission lock which prevents the transmission linkage from being moved out of the "Park" position until the ignition switch is moved out of the "Lock" position. The interlock mechanism also prevents the ignition switch from being moved into the "Lock" position unless the transmission is in the "Park" position. The transmission lock includes a bellcrank having an arm operably connected to the cable of the ignition lock mechanism and another end attached to a pawl. The pawl is slidably mounted on a support frame and is movable by the bellcrank to a lock position relative to a stop plate on the detent releasing mechanism when the shift lever is in the "Park" position and the ignition lock mechanism is actuated or locked to prevent movement of the shift lever out of the "Park" position when the ignition lock mechanism is actuated. When the detent releasing shaft is depressed to move the shift lever from the "Park" position, the stop plate is moved to a position where it cannot be engaged by the pawl and prevents movement of the pawl should the driver attempt to lock the ignition lock mechanism. As a result, the ignition lock mechanism cannot be actuated by the driver when the shift lever is in a position other than "Park".

SUMMARY OF THE INVENTION

The invention contemplates an improved vehicle transmission shift control mechanism having a novel locking mechanism for preventing movement of the shift lever from the "Park" position when the vehicle ignition lock mechanism is in the "Lock" position.

The invention also contemplates an improved transmission shift control mechanism of the type disclosed in the preceding paragraph wherein the locking mechanism prevents actuation of the vehicle ignition lock mechanism to the "Lock" position when the shift lever is not in the "Park position.

In accordance with a typical working embodiment of the invention, the transmission shift control mechanism includes a shift lever means pivotal on a support base or frame between a "Park" position and other operative positions such as drive, reverse, neutral, etc. The shift lever means is selectively retained in one of these positions by a detent mechanism which releasably couples the shift lever means and support base. Preferably, the detent mechanism releasably couples the shift lever means and a detent cam plate attached on the support base. The detent mechanism is released out of coupling relation between the detent cam plate and shift lever means to free the shift lever for repositioning.

A locking mechanism is provided for preventing movement of the shift lever means from the "Park" position when the vehicle ignition lock mechanism is actuated to the "Lock" position and for preventing such actuation of the vehicle ignition lock mechanism when the shift lever means is in an operative position other than the "Park" position.

The locking mechanism includes a locking lever pivotally disposed on the support base, preferably on the detent cam plate, and is operably connected to the vehicle ignition lock mechanism for pivotal movement to a locking position relative to the detent means to prevent release thereof when the ignition lock mechanism is actuated to the "Lock" position with the shift lever means in the "Park" position.

The locking mechanism also includes a locking member such as for example as an elongate locking pin on the shift lever means, preferably on the shift lever support base or frame, for movement therewith along the locking lever to a cooperative position when the shift lever means is placed in the "Park" position. In the cooperative position, the locking lever can pivot relative to the locking member to the locking position upon actuation of the ignition lock mechanism to the "Lock" position to block movement of the detent means. The locking member is also movable along the locking lever to a non-cooperative position therewith when the shift lever is in positions other than the "Park" position In the non-cooperative position, the locking member prevents pivoting of the locking lever to the locking position and thus prevents actuation of the vehicle ignition lock mechanism to the "Lock" position unless the shift lever means is in the "Park" position.

In a preferred embodiment of the invention, the locking lever includes one arm operably connected to the cable of the vehicle ignition lock mechanism, a locking arm movable to the locking position to block release or disengagement of the detent means when the shift lever is in the "Park" position and a pivot between the arms. Preferably, the looking arm includes a cam slot in which the locking member moves between the cooperative and non-cooperative positions. The locking member moves toward the pivot to the cooperative position when the shift lever is placed in the "Park" position and away from the pivot to the non-cooperative position when the shift lever is moved to a position other than the "Park" position. When the ignition lock mechanism is actuated to the "Lock" position with the shift lever in the "Park" position, the locking lever can pivot past the locking member by virtue of a special configuration of the cam slot. When the shift lever is not in the "Park" position, the locking member is positioned in the cam slot to prevent pivoting of the locking lever in the event the driver attempts to actuate the ignition lock mechanism.

The locking member preferably is disposed on a carrier plate connected to and moveable with the shift lever with the locking member extending between the carrier plate and the locking lever.

In another preferred embodiment of the invention, a transmission shift control mechanism requiring no adjustment upon assembly in the vehicle with the ignition lock mechanism is provided by using the pivot axis of the locking lever on the detent plate as the main gage or reference point of certain components of the mechanism and a novel geometry for the locking lever.

BEST MODE FOR PRACTICING THE INVENTION

Referring to FIGS. 1-8, a transmission shift control mechanism 10 is shown including a support base or frame 12 adapted to be secured to a vehicle body member such as a floor pan member 14 by a plurality of fasteners 16 (only one shown) extending through holes 18 in the base 12.

The base or frame includes a well 20 having a stationary pivot shaft 21 mounted therein. Shaft 21 is held fixed in well 20 by enlarged head 21a on one shaft end and a retaining ring (not shown) on the opposite shaft end. An inverted U-shaped shift lever carrier frame or member 26 includes spaced apart depending side walls 26a,26b pivotably mounted on the shaft 21 by bushings 27. Depending side walls 26a,26b are connected by lateral wall 26c and depending rear wall 26e. Lateral wall 26c of carrier member 26 has attached thereto as by welding a hollow upstanding shift lever 28. Carrier member 26 includes a bottom flange 26d extending from rear wall 26e and to which the lower end of shift lever 28 is attached as by welding.

Figure 5:
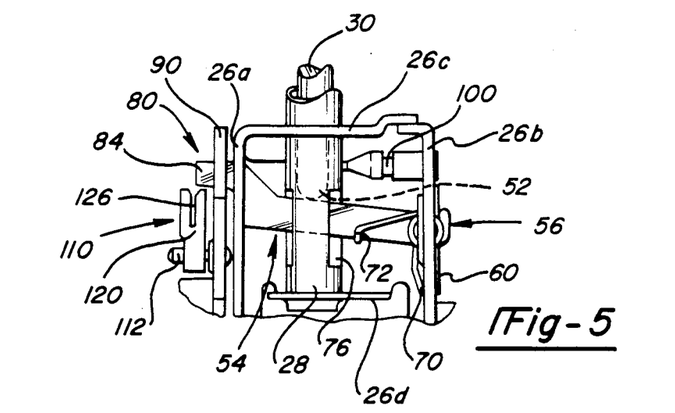
FIG. 5 is a view taken along lines 5—5 of FIG. 1.
Figure 6:
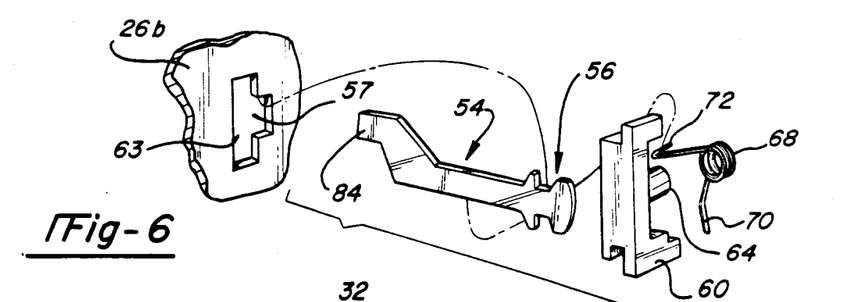
FIG. 6 is an exploded view of the detent mechanism between the shift lever and detent plate.
Figures 7, 8:
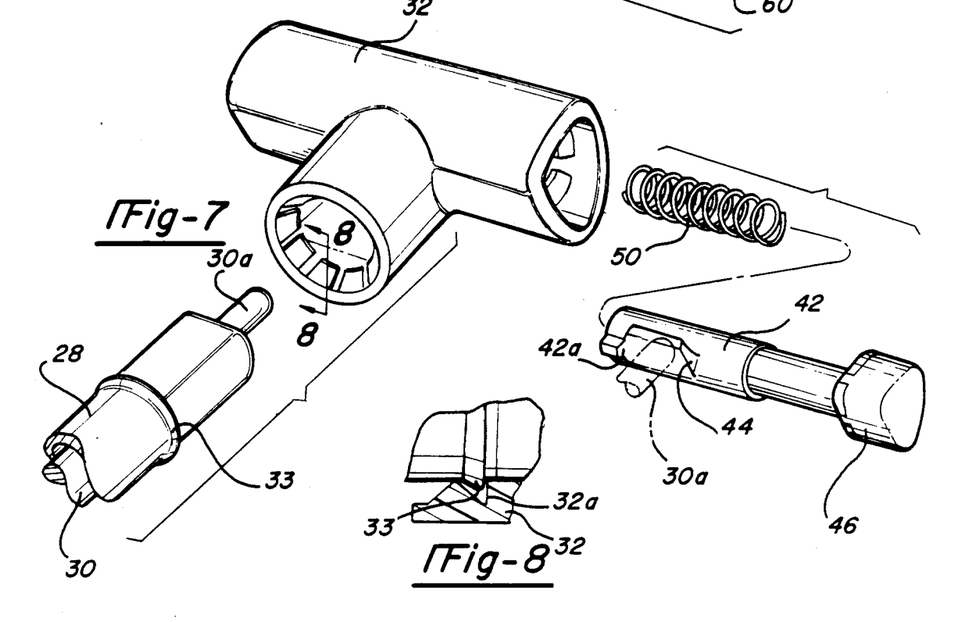
FIG. 7 is an exploded view of the handle of the shift lever showing the detent actuating shaft and pushbutton.
FIG. 8 is a view taken along lines 8—8 of FIG. 7.

Received for sliding movement in the shift lever 28 is an actuator rod 30, FIGS. 5 and 7. The actuator rod extends into handle 32 where nose 30a of the actuator rod is positioned in a recess 42a in a pushbutton shaft 42 slidably received in the handle for movement perpendicular to the rod 30. Handle 32 includes a recess 32a receiving a flange 33 on shift lever 28 in snap-fit engagement to retain the handle thereon.

Recess 42a includes cam surface 44 that forces the actuator rod downwardly in the shift lever when the pushbutton 46 is pressed toward the handle by the driver. A coil return spring 50 is disposed around pushbutton shaft 42 and biases the pushbutton and pushbutton shaft away from the handle in known fashion when manual pressure on the pushbutton is released.

As best seen in FIG. 5, the opposite end of actuator rod 30 includes a depending nose 52 that engages spring biased pawl member or detent engaging member 54 pivotably mounted between side walls 26a,26b on carrier member 26. In particular, pawl member 54 includes slotted end 56 pivotably mounted in a slot 57 in side wall 26b.

A spacer 60 is provided and has a cylindrical hub 64 on which a coil spring 68 is received and positioned. Spacer 60 is attached in a slot 63 in side wall 26b. One end 70 of the coil spring abuts against the carrier member, FIG. 5, and the other end 72 engages the pawl member 54 to bias it upwardly. As shown in FIG. 5, the pawl member extends through a cross-slot 76 in the shift lever and extends under the actuator rod. End 80 of the pawl member extends through a slot 82 in side wall 26a of carrier member 26 and terminates in pawl 84.

Figure 1:
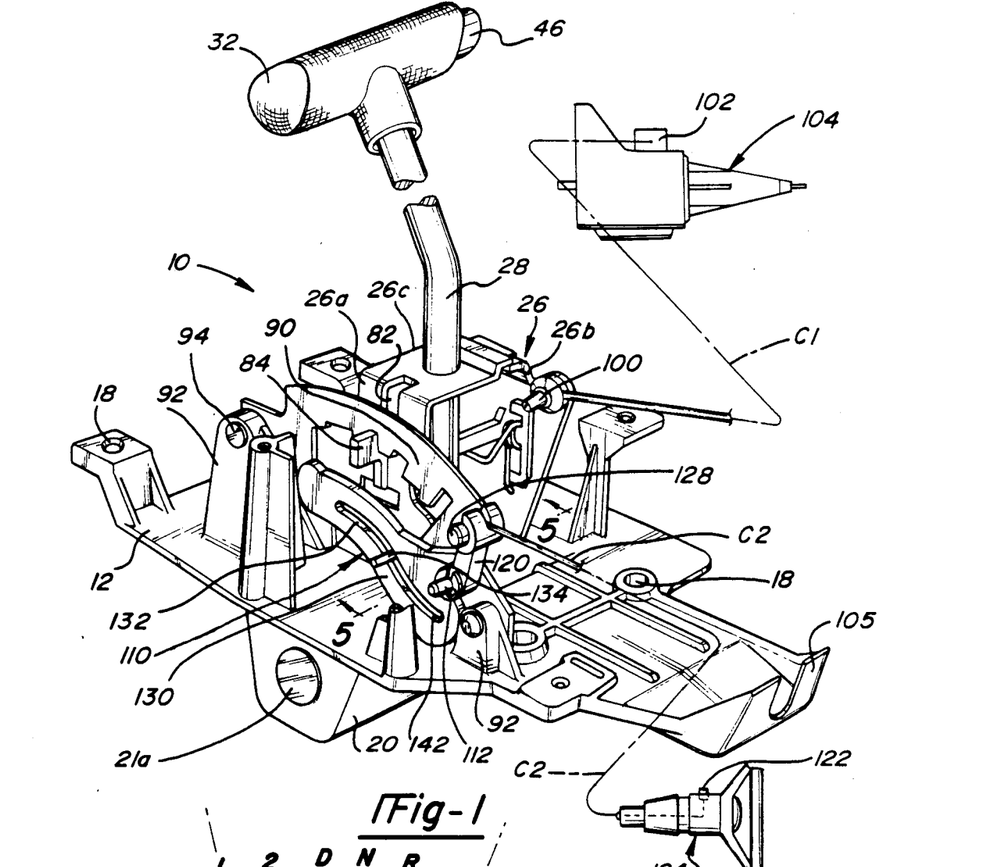
FIG. 1 is a perspective view of a transmission shift control mechanism of the invention and includes diagrammatic representations of a vehicle transmission and vehicle steering column inter-connected therewith.
Figure 2:
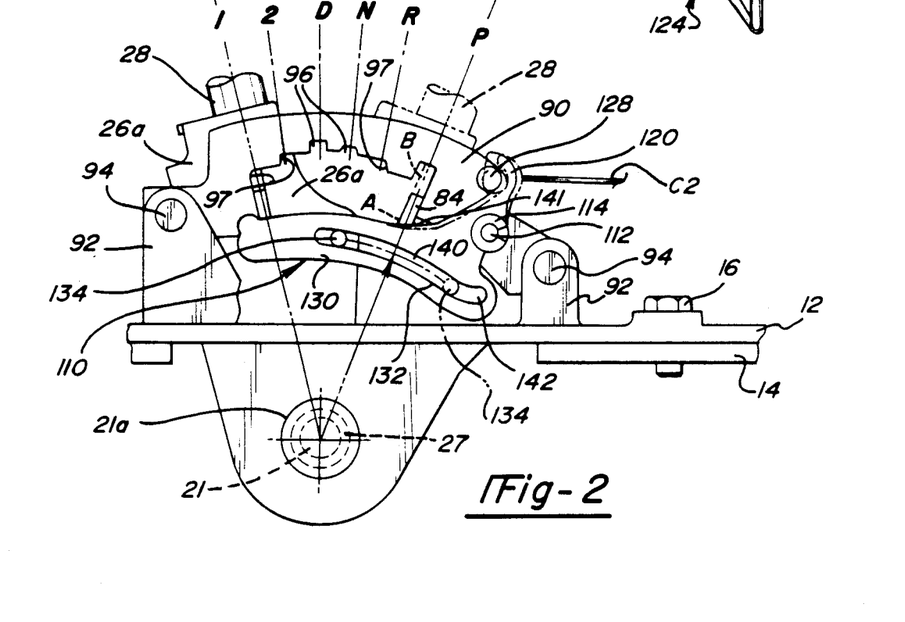
FIG. 2 is an elevation of the transmission shift control mechanism with the shift lever shown in a drive position and in the unlocked orientation in "Park" position

Pawl 84 is adapted to releasably couple the shift lever, which includes shift lever carrier member 26, to a detent cam plate 90 fastened in stationary position on support base 12 as shown best in FIGS. 1 and 2. In particular, detent plate 90 is secured to upstanding posts 92 on the support base by rivets 94.

Detent cam plate 90 includes a plurality of notches or slots 96 into which pawl 84 can be releasably coupled or engaged to place and retain the shift lever in the "Park" position P, neutral position N, and drive position D, and further includes stop surfaces 97 for positioning and retaining pawl 84 in a reverse position R and drive two position D2 and drive one position D1 in known manner.

To reposition the shift lever, the driver depresses pushbutton 46 toward handle 32 and pivots the shift lever to the desired operative position P, R, N, D, 2, 1. Depressing the pushbutton causes actuator rod 30 to release or decouple pawl 84 downwardly out of engagement with the detent plate 90. When the shift lever is in the desired operative position, the driver releases the pushbutton and spring 68 biases the pawl upwardly against and coupling with the detent plate to retain the shift lever at the selected operative position P, R, N, D, 2, or 1.

The manually operable detent means thus includes the spring biased pawl, detent cam plate and actuator rod and associated components in the shift lever.

During such pivotable movement of shift lever 28, a stud 100 affixed on carrier member 26 actuates a known push-pull cable C1 extending to a conventional shifter valve 102 on automatic transmission 104 to place the transmission in the desired operational mode corresponding to the shift lever position P, R, N, D, 2, or 1. Stud 100 pivots with carrier member 26 since both are connected to the shift lever. Cable C1 is attached to stud 100 and passes through fitting 103 attached on extension 105 of base frame 12.

Pivotally mounted on detent plate 90 is a locking lever in the form of bellcrank 110. Bellcrank 110 is pivotably mounted on pivot shaft 112 affixed at one end to detent plate 90. A retaining ring 114 is mounted on the outbound end of pivot shaft 112.

Those skilled in the art will appreciate that bellcrank 110 can be pivotally mounted side-by-side adjacent detent plate 90 from other portions of base frame 12. The invention is not limited to mounting bellcrank 110 on the detent plate, although this is preferred to eliminate tolerances associated with other portions of the base frame; e.g., riveting, welding and other tolerances associated with fabricating the base frame.

Bellcrank 110 includes a first arm 120 operably connected to a push-pull lock cable C2 extending to ignition lock mechanism 122 on the vehicle steering column 124. Cable C2 extends through a slot 126 in arm 120 and is fastened to short rod 128 (or other suitably shaped member) held in the cradle formed by curvilinear arm 120. The outer conduit 127 of push-pull cable C2 includes an integral elongated end or arm extending to pivot 112 and having gage hole 127a receiving pivot 112 in a preferred embodiment. The base 127b of the integral end is fastened to support base 12. Short rod 128 is preset during manufacturing with gage hole 127a to control tolerance stack-up within the cable assembly. The invention is not limited to mounting the outer cable conduit on pivot 112, however.

The axis of pivot 112 on detent plate 90 is used as the primary gage or reference point relative to which significant dimensions of such components of the transmission shift control mechanism as the ignition lock mechanism (including cable C2), locking mechanism (locking lever 110 and locking member 134), shift lever mechanism (shift lever 28 and carrier member 26 and profile of slots 96 and stop surfaces 97 on the detent cam plate 92) are taken. Use of the pivot axis as the gage or reference point for dimensioning these other components together with the geometry of the locking lever and beneficial stacking of tolerances for these components substantially eliminates any need for adjustment of the components of the shift control mechanism 10 after assembly in the vehicle with the ignition lock mechanism 122 on the steering column.

Ignition lock mechanism 122 can be a conventional steering column locking mechanism currently used for automotive vehicles such as for the Ford Escort and Topaz automobiles. As is well known, these mechanisms prevent rotation of the steering wheel and hold the cable C2 of the ignition lock mechanism stationary when actuated to the "Lock" position or mode by turning the ignition key to that position or mode on the steering column. Illustrative of such ignition lock mechanism is that shown in U.S. Pat. No. 3,648,490 to Kimberlin et al issued Mar. 14, 1972.

Bellcrank 110 also includes an elongate second locking arm 130 extending side-by-side adjacent detent plate 90. Second arm 130 includes a specially configured cam slot 132 adapted to receive a locking member in the form of elongate locking cam pin 134 extending from carrier member 26. Locking cam pin or member 134 has an inboard end 136 affixed on side wall 26a of the carrier plate and an outboard end 138 that is received and rides in cam slot 132. Locking pin or member 134 moves in an arcuate (circular arc) path since it is attached to the carrier member for movement therewith about the pivot axis defined by shaft 21.

Cam slot 132 includes a first circular arc portion 140 and a second circular arc portion 142. The center of circular arc portion 140 corresponds to pivot axis of shift lever 28 on shaft 21 whereas the center of circular arc portion 142 is on the opposite side of the bellcrank and corresponds to the pivot axis of the bellcrank 110.

Those skilled in the art will appreciate that portion 142 of cam slot 132 may have a configuration other than a circular arc so long as the locking lever can pivot past locking pin 134 in response to actuation of the ignition lock mechanism to the "Lock" position with the shift lever in the "Park" position as will be explained.

In operation when shift lever 28 is moved among operative positions R, N, D, 2 and 1 with the ignition lock mechanism unlocked and pawl 184 depressed out of engagement with the detent plate 90, locking pin or member 134 will move in a circular arc path in first circular arc portion 140 of the bellcrank slot. Bellcrank 110 thus will not be pivoted substantially by the locking cam pin 134 during such movement. The position of pin 134 in cam slot 132 when shift lever 28 is in different drive positions is shown in FIGS. 1 and 2.

Movement of the shift lever 28 from the drive position D (or other operative positions) toward the "Park" position P causes locking pin 134 to travel forward in cam slot 132 to the position shown in phantom in FIG. 2. Locking pin 134 is placed in proximity to the juncture of the first circular arc portion 140 and second circular arc portion 142 when the shift lever is positioned at the "Park" position.

Pawl 84 is shown in solid in FIG. 2 in the depressed position A just after movement of the shift lever to the "Park" position. Pawl 84 is shown in phantom in FIG. 2 in the releasably coupled or engaged position B with the detent plate 90 after pushbutton 46 is released by the driver and prior to the driver's actuating the ignition lock mechanism to the "Lock" position by rotating the ignition key on the steering column. Thus, bellcrank 110 still has not been pivoted.

Figure 3:
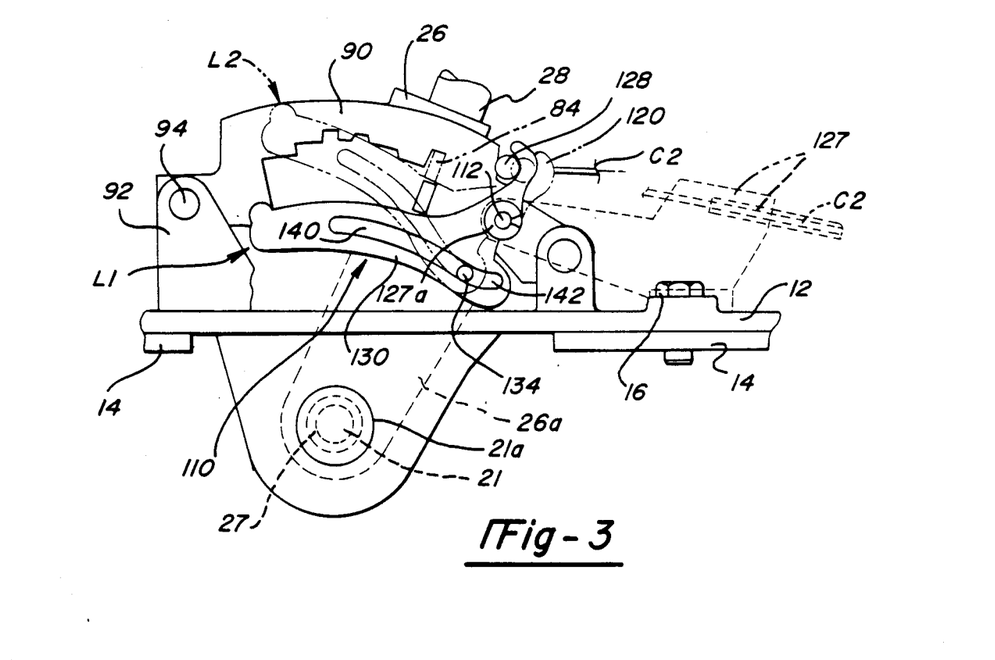
FIG. 3 is a similar view as FIG. 2 with the shift lever shown in the "Park" position and the locking lever shown in locked and unlocked positions.
Figure 4:
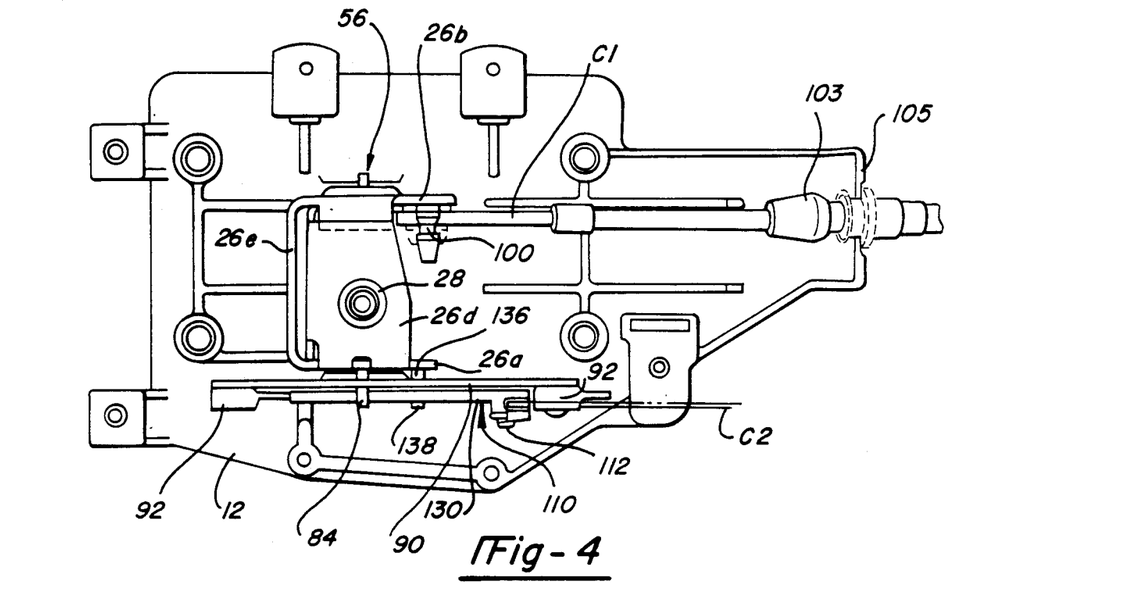
FIG. 4 is a plan view of the transmission shift control mechanism of FIG. 1.

Once the driver actuates the ignition lock mechanism to the "Lock" position by turning the ignition key in known fashion, cable C2 will exert a pull on arm 120 to pivot bellcrank from the position L1 shown in FIG. 3 to the raised locking position L2 where elongate arm 130 is in blocking or locking relation to pawl 84 disposed in the "Park" slot in the detent plate 90.

Since lock cable C2 is held stationary and maintains a pull on arm 120 as long as the ignition lock mechanism is actuated to the "Lock" position, bellcrank 110 is held in the pivoted position L2 (locking position) of FIG. 3 with elongate arm 130 preventing movement of pawl 84 from the "Park" slot on the detent plate by the driver's depressing pushbutton 46. Thus, in the pivoted locking position, locking arm 130 prevents the driver from moving the shift lever 28 from the "Park" position when the ignition lock mechanism is actuated to the "Lock" position as mentioned above.

During pivoting of bellcrank 110 to the locking position of FIG. 3, locking pin 134 remains stationary while arm 130 moves there past in cooperative manner. Second circular arc portion 142 is configured to cooperate with pin 134 to allow such pivoting of the bellcrank relative to locking pin 134 in response to actuation of the ignition lock mechanism to the "Lock" position when the shift lever is positioned in the "Park" position. Thus, locking pin 134 and bellcrank 110 are in cooperative position when the locking pin is received in the second circular arc portion 142; i.e., when the shift lever is in the "Park" position.

When the driver unlocks the ignition lock mechanism by turning the ignition key, the lock cable C2 will slidably extend to the left (solid position) in FIG. 3 to allow counterclockwise pivoting of the bellcrank 110 about its pivot to the position L1 shown in FIG. 3. Locking pin 134 will still remain stationary and arm 130 will pivot by gravity past the locking pin as permitted by circular arc portion 142.

The driver can now depress pushbutton 46 to release pawl 84 for movement of the shift lever to one of the other operative shift lever positions R, N, D, 1 or 2. Locking pin 134 will move with the shift lever and carrier member 26 in a circular arc path in first circular arc portion 140 of cam slot 132.

During operation with the shift lever in a position other than the "Park" position, the locking pin 134 and first circular arc portion 140 of cam slot 132 are non-cooperatively positioned to prevent pivoting of the bellcrank 110 in response to actuation of the ignition lock mechanism to the "Lock" position by the driver. Locking pin 134 is held fixed by pawl 84 coupling carrier member 26 to the detent plate 90 so that arm 130 cannot move substantially if the driver attempts to lock the ignition lock mechanism. Thus, bellcrank 110 and locking pin 134 prevent actuation of the ignition lock mechanism to the "Lock" position when the shift lever is in a position other than the "Park" position.

Figure 9:
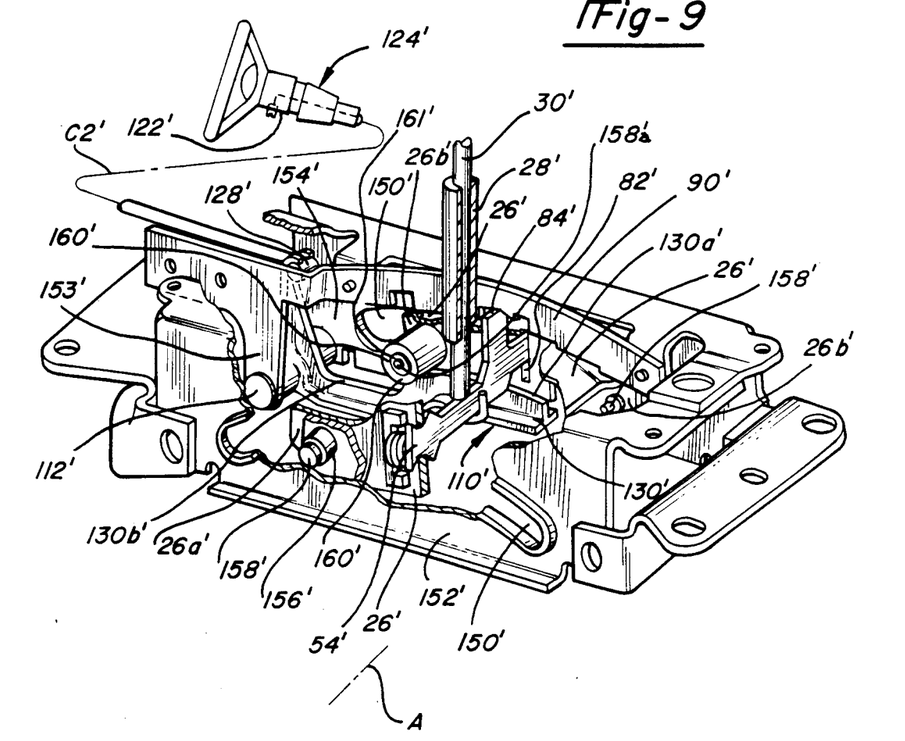
FIG. 9 is a perspective view of another embodiment of the invention with some features broken away.
Figure 10:
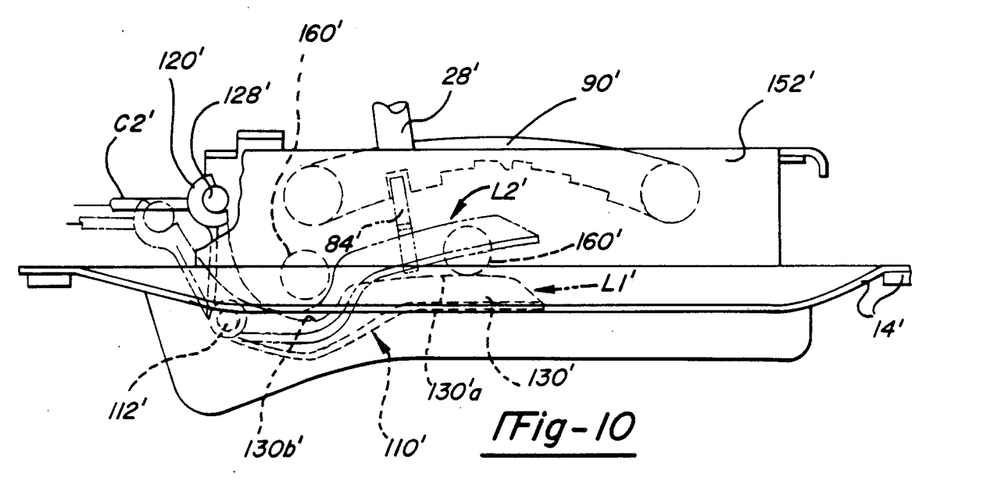
FIG. 10 is an elevation of FIG. 9 showing different operative positions of the locking lever.

FIGS. 9-10 illustrate another embodiment of the invention having a locking mechanism configured somewhat differently from that disclosed above and further having the shift lever pivotable about an imaginary pivot axis to reduce the vertical dimension of the shift control mechanism. In FIGS. 9-10, like features of previous Figures are represented by like reference numerals primed. In FIGS. 9-10, the shift lever 28' is attached to and movable with an inverted U-shaped shift lever carrier member 26'. Shift lever carrier member 26' is movably disposed on arcuate tracks 150' formed in side walls 152',154' of housing 160'. Tracks 150' are in the form of circular arc tracks that extend about centers on a common axis A forming an imaginary pivot axis for carrier member 26' and the shift lever thereon. Side walls 26a',26b' of the carrier member each include a pair of spaced apart tubular wheels 156' (only one shown) on a respective axle 158' (only one shown) extending outwardly from the side walls. Wheels 156' travel along tracks 150' when the shift lever is moved to operative positions.

Bellcrank 110' is pivotally disposed on depending leg 153' of detent plate 90' and includes a first arm 120' operably connected to push-pull cable C2' and a second elongate locking arm 130' adjacent detent plate 90' and having a curvilinear surface 130a' and a recess-defining surface 130b'.

A locking member 160' is carried on carrier member 26' for movement therewith. Locking member 160' is coaxial with an axle on side wall 26b'. In particular, cylindrical extension 158a' of the axle extends inwardly of side wall 26b' and tubular locking cam member 160' is secured on the extension by retainer ring 161'.

When the shift lever is placed in the "Park" position, FIG. 10' the locking lever is initially in the lower position L1, shown. When the ignition lock mechanism is actuated to the "Lock" position, cable C2' pulls arm 120' forward and the locking lever is pivoted counterclockwise to the raised locking position L2' shown in FIG. 10 to block pawl 84'. Pawl 84' is in the upward position to engage detent plate 90'. With the shift lever in the "Park" position, locking member 160' is disposed in the recess defined by surface 130b' in a cooperative position with the locking lever such that the locking lever can pivot to the raised locking position L2, shown in FIG. 10.

When the shift lever is placed in other than the "Park" position with the ignition lock mechanism released from the "Lock" position and with pawl 84' depressed to the lower released position by actuation of actuator rod 30', locking member 160' moves along second locking arm 130' in overlying relation thereto to a non-cooperative position to prevent pivoting of the locking arm 130' in the event the driver attempts to actuate the ignition lock mechanism when the shift lever is not in "Park" position.

Figure 11:
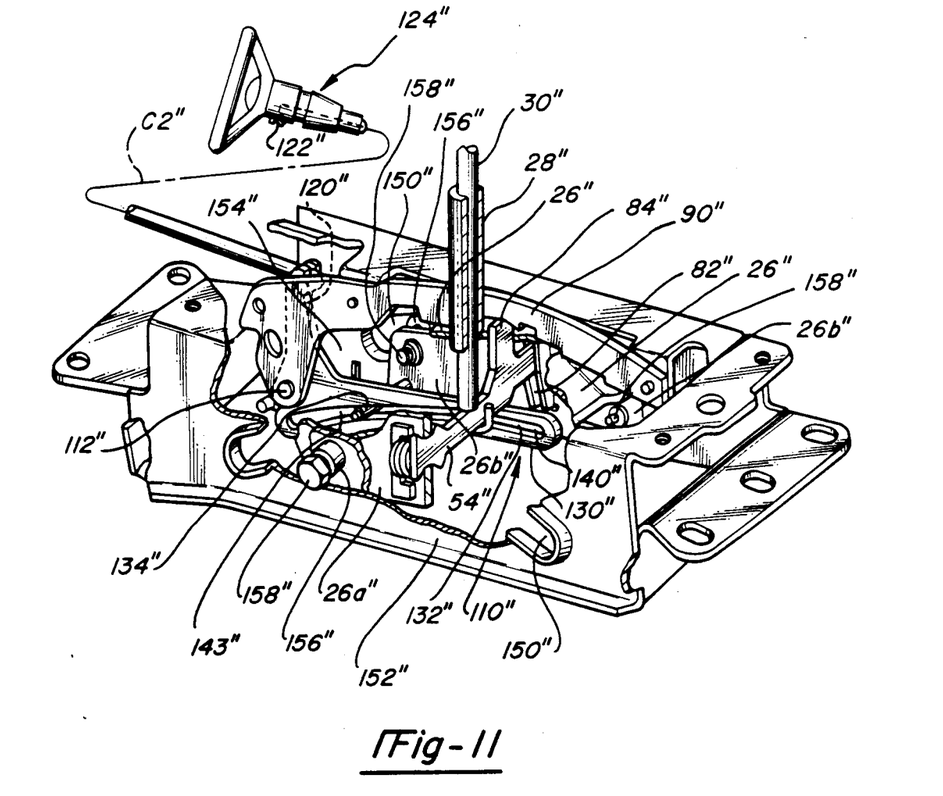
FIG. 11 is a perspective view of still another embodiment of the invention with some features broken away.

In other respects, operation of the transmission shift control mechanism of FIGS. 9-11 and attendant advantages are similar to those of the embodiment of FIGS. 1-8.

FIG. 11 illustrates still another embodiment of the invention incorporating the low profile shift control mechanism of FIGS. 9-10 and a locking mechanism similar to FIGS. 1-8. In FIG. 11, features that are like or similar to features of FIGS. 1-10 are represented by like reference numerals double primed.

In FIG. 11, shift lever 28", is attached to and movable with inverted U-shaped shift lever carrier member 26". Carrier member 26" includes tubular wheels 156" (two shown) on axles 158" with wheels 156" riding in arcuate tracks 150" as in the embodiment of FIGS. 9-10. Axles 158" are in the form of bolts threaded into walls 26a", 26b" and have a smooth intermediate shank on which the wheels are rotatably disposed.

Bellcrank 110" is configured similar to that of FIGS. 1-8 and includes a first arm 120" operably connected to push-pull cable C2" and a second locking arm 130" having arcuate cam slot 132". Locking pin 134" extends from side wall 26b" of the shift lever carrier member 26" into the cam slot for movement therein between the aforesaid cooperative and non-cooperative positions with the bellcrank. In particular, cam slot 132" includes arcuate portion 140" and enlarged arcuate portion 143" into which locking pin 134" moves to a respective non-cooperative position (in portion 140") and a cooperative position (in portion 143") with the bellcrank.

Bellcrank 110" is pivotally disposed on detent plate 90" as in the embodiment of FIGS. 1-8.

Operation of the transmission shift control mechanism of FIG. 11 is like that of previously described embodiments of FIGS. 1-10 with the same features or components functioning in the same general way.

In the embodiments of FIGS. 1-11, the cable C2 (C2', C2") can be spring biased to exert a pull on first arm 120 (120', 120") at all times. For example, the end of cable C2 extending to the ignition lock mechanism 122 may include a suitable spring (not shown) thereon to bias cable C2 to exert a pull on the first arm at all times so as to position bellcrank 110 (110', 110") in the raised position L2 (L2') whenever the shift lever is in "Park". When the shift lever is in the "Park" position with the ignition lock mechanism actuated to the "Lock" position and with the cable C2 (C2', C2") so biased, the second arm 130 (130', 130") of the bellcrank will be held and biased against the pawl 84 (84', 84") to prevent the driver from moving the shift lever out of the "Park" position.

To move the shift lever from the "Park" position, the driver unlocks the ignition lock mechanism and actuates the shift lever pushbutton to depress pawl 84 (84', 84"). Depression of the pawl (e.g. pawl 84 in FIG. 2) will cause the pawl to engage the bellcrank locking arm 130 (at surface 141 in FIG. 2) to pivot the bellcrank to the lower position (L1 in FIG. 2). When the shift lever is then pivoted to another position, locking pin 134 will move along the locking arm to a non-cooperative position with the locking arm biased against the locking pin and the locking pin will prevent pivoting of the bellcrank and thus actuation of the ignition lock mechanism when the shift lever is not in "Park"

Upon return of the shift lever to the "Park" position and release of the shift lever pushbutton to allow the pawl to engage the "Park" slot on detent plate 90, the bellcrank will be biased to the raised locking position by virtue of sping bias on cable C2. Actuation of the ignition lock mechanism to the "Lock" position will then hold the cable substantially stationary such that the bellcrank blocks any attempt to depress the pawl.

Spring biasing of cable C2 (C2', C2") is advantageous to prevent rattling or other unwanted movement between the bellcrank when engaged with the pawl and locking pin.

While the invention has been described in terms of specific embodiments thereof, it is not intended to be limited thereto but rather only to the extent set forth hereafter in the following claims.

What is claimed:

1. In a transmission shift control mechanism for a vehicle having an ignition lock mechanism with a "Lock" position, the combination of:

a support base for securing to a vehicle, a shift lever means disposed on the support base for pivotal movement between a "Park" position and other operative positions, detent means for releasably coupling the shift lever means and support base to selectively retain said shift lever means in one of said "Park" position or other operative positions and for permitting, when actuated to decouple the shift lever means, repositioning of said shift lever means, and a locking mechanism including a locking lever pivotally disposed on the support base and operably connected to the ignition lock mechanism for movement about a pivot axis relative to the detect means to a locking position to prevent actuation of the detent means when the ignition lock mechanism is actuated to the "Lock" position with the shift lever means in the "Park" position and a locking member disposed on the shift lever means for movement along the locking lever to a cooperative position therewith when the shift lever means is positioned in the "Park" position where, at said cooperative position, the locking lever can pivot relative to the locking member to said locking position upon actuation of the ignition lock mechanism to the "Lock" position and to a non-cooperative position therewith when the shift lever means is positioned in said other positions where, at said non-cooperative position, the locking member prevents pivoting of said locking lever, cable means comprising a cable operably interconnecting said ignition lock mechanism and said locking lever and an outer conduit disposed about the cable, said cable having a cable end connected to said locking lever, said conduit having a conduit end proximate the cable end and connected on said support base in fixed, nonadjustable relation to said pivot axis, and said pivot axis of said locking lever defining a reference point on said transmission shift control mechanism relative to which said locking mechanism and said cable means are positioned such that upon assembly of said transmission shift control mechanism with said ignition lock mechanism in the vehicle, said locking mechanism, said cable means and said ignition lock mechanism are operably positioned without the need for relative adjustment between said shift control mechanism and said ignition lock mechanism.

2. In a transmission shift control mechanism for a vehicle having an ignition lock mechanism with a "Lock" position, the combination of:

a support base for securing to a vehicle, a shift lever means disposed on the support base for pivotal movement between a "Park"πposition and other operative positions, detent means for releasably coupling the shift lever means and support base to selectively retain said shift lever means in one of said "Park" position or other operative positions and for permitting, when actuated to decouple the shift lever means, repositioning of said shift lever means, and a locking mechanism including a locking lever pivotally disposed on the base, said locking lever having one arm operably connected to the ignition lock mechanism for pivoting the locking lever, another arm having an arcuate slot and movable relative to the detent means to a locking position to prevent actuation of the detent means and decoupling of the shift lever means when the ignition lock mechanism is actuated to the "Lock" position with the shift lever means in the "Park" position and having a pivot axis between said arms, and further including a locking member disposed on the shift lever means and received in the slot for arcuate movement in said slot to a cooperative position with the locking lever when the shift lever means is positioned in the "Park" position where, at said cooperative position, the locking lever can pivot relative to the locking member to said locking position with said locking member remaining in said slot upon actuation of the ignition lock mechanism to the "Lock"πposition and to a non-cooperative position with the locking lever when the shift lever means is positioned in said other positions where, at said non-cooperative position, the locking member prevents pivoting of said locking lever, cable means comprising a cable operably interconnecting said ignition lock mechanism and said locking lever and an outer conduit disposed about the cable, said cable having a cable end connected to said locking lever, said conduit having a conduit end proximate the cable end and connected on said support base in fixed, nonadjustable relation to said pivot axis, and said pivot axis of said locking lever defining a reference point on said transmission shift control mechanism relative to which said locking mechanism and said cable means are positioned such that upon assembly of said transmission shift control mechanism with said ignition lock mechanism in the vehicle, said locking mechanism, said cable means and said ignition lock mechanism are operably positioned without the need for relative adjustment between said shift control mechanism and said ignition lock mechanism.

3. In a transmission shift control mechanism for a vehicle having an ignition lock mechanism with a "Lock" position, the combination of:

a support base for securing to a vehicle, a shift lever means pivotally disposed on the support base for pivotal movement between a "Park" position and other operative positions, a detent plate secured on the support base, a detent means for operably coupling the shift lever means and detent plate when engaged therebetween to selectively retain said shift lever means in one of said "Park" position or other operative positions and movable out of engagement to permit repositioning of the shift lever means, and a locking mechanism including a locking lever pivotally disposed on the detent plate, said locking lever having one arm operably connected to the ignition lock mechanism for pivoting the locking lever, another arm having an arcuate slot and movable relative to the detent means to a locking position to prevent disengagement of the detent means when the ignition lock mechanism is actuated to the "Lock" position with the shift lever means in the "Park" position and having a pivot axis between said arms, and further including a locking member received in the slot and disposed on the shift lever means for arcuate movement in said slot to a cooperative position with the locking lever when the shift lever means is positioned in the "Park" position where, at said cooperative position, the locking lever can pivot relative to the locking member and detent means to said locking position with said locking member remaining in said slot upon actuation of the ignition lock mechanism to the "Lock" position and to a non-cooperative position with the locking lever when the shift lever means is positioned in said other positions where, at said non-cooperative position, the locking member prevents pivoting of said locking lever, cable means comprising a cable operably interconnecting said ignition lock mechanism and said locking lever and an outer conduit disposed about the cable, said cable having a cable end connected to said locking lever, said conduit having a conduit end proximate the cable end and connected on said support base in fixed, nonadjustable relation to said pivot axis, and said pivot axis of said locking lever defining a reference point on said transmission shift control mechanism relative to which said locking mechanism and said cable means are positioned such that upon assembly of said transmission shift control mechanism with said ignition lock mechanism in the vehicle, said locking mechanism, said cable means and said ignition lock mechanism are operably positioned without the need for relative adjustment means upon assembly of the shift control mechanism in the between said shift control mechanism and said ignition lock mechanism.

4. The shift control mechanism of claims 1, 2 or 3 wherein said conduit end includes a portion that is fixedly positioned at said pivot axis.

5. The shift control mechanism of claim 4 wherein said pivot axis is defined by a pivot shaft and wherein said conduit end includes portion having a hole receiving said pivot shaft so as to position said portion of said conduit end at said pivot axis.

* * * * *